(12) United States Patent
Takehara et al.

(10) Patent No.: US 6,345,504 B1
(45) Date of Patent: Feb. 12, 2002

(54) PRETENSIONER WITH GAS ESCAPE MECHANISM

(75) Inventors: Hiroki Takehara; Hikaru Kameyoshi; Hiromasa Tanji; Joji Mishina, all of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/644,678

(22) Filed: Aug. 24, 2000

(30) Foreign Application Priority Data

Aug. 25, 1999 (JP) .......................................... 11-238783

(51) Int. Cl.⁷ ................................................ F01B 29/08
(52) U.S. Cl. .......................................... 60/638; 60/632
(58) Field of Search ........................... 60/632, 634, 638

(56) References Cited

U.S. PATENT DOCUMENTS

| | | | | |
|---|---|---|---|---|
| 4,442,674 A | * | 4/1984 | Fohl ............................. | 60/632 |
| 4,444,010 A | | 4/1984 | Bendler ........................ | 60/407 |
| 5,690,295 A | | 11/1997 | Steinberg et al. ........... | 242/374 |
| 5,875,634 A | * | 3/1999 | Wohlenberg et al. ......... | 60/632 |
| 5,881,962 A | | 3/1999 | Schmidt et al. ............. | 242/374 |

FOREIGN PATENT DOCUMENTS

| | | |
|---|---|---|
| DE | 199 09 938 | 8/2000 |
| EP | 0 680 856 | 3/1995 |
| WO | WO 95/27638 | 10/1995 |
| WO | WO 96/25310 | 8/1996 |

* cited by examiner

Primary Examiner—Hoang Nguyen
(74) Attorney, Agent, or Firm—Foley & Lardner (57) ABSTRACT

To provide a pretensioner with improved safety, wherein gas is allowed to escape appropriately in the event that the internal gas pressure rises excessively, and there are no adverse effects on other equipment. A pretensioner is provided with a pipe and multiple balls are provided within the pipe. The balls are metal spheres such as aluminum and the ball nearest the gas generator is formed of a suitable material such as a resin of silicone rubber. A hole is bored in the resin ball in the longitudinal direction of the pipe. The hole is plugged off at the side of the gas generator and is opened on the side of the ball. A through hole perforating the next ball to the resin ball is bored in the longitudinal direction. A rod-shaped piston is stored between the hole of the resin ball and the hole of the next ball. When abnormal pressure is generated, the resin ball breaks and the gas pressure is placed directly on the piston. The abnormal pressure is thereby provided a pathway to dissipate in the direction of the balls' movement.

7 Claims, 8 Drawing Sheets

PRIOR ART

PRETENSIONER WITH GAS ESCAPE MECHANISM

This application is related to Japanese Patent Application No. H11-238783, filed on Aug. 25, 1999, the disclosure of which is hereby incorporated by reference in its entirety.

FIELD OF INVENTION

The present invention relates to a pretensioner that is built into a seatbelt device for restraining passengers to the seats of vehicles and the like, for rotating the take-up shaft for a seatbelt in the take-up direction in an emergency. More particularly, the present invention relates to a pretensioner with improved safety, wherein gas is allowed to escape appropriately in the event that the internal gas pressure rises excessively and there are decreased adverse effects on other equipment.

BACKGROUND OF THE INVENTION

Figure 9A:
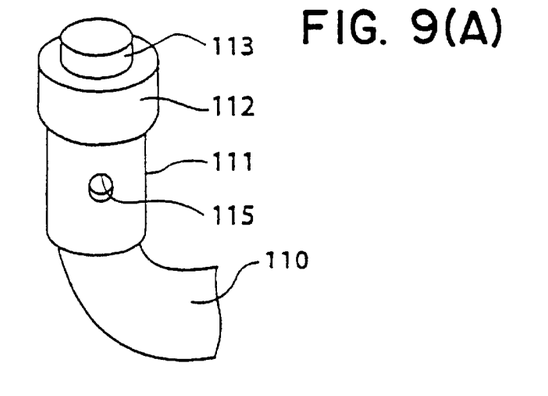
FIG. 9(A) is a perspective view illustrating the configuration of the pipe base portion of a conventional pretensioner.
Figure 9B:
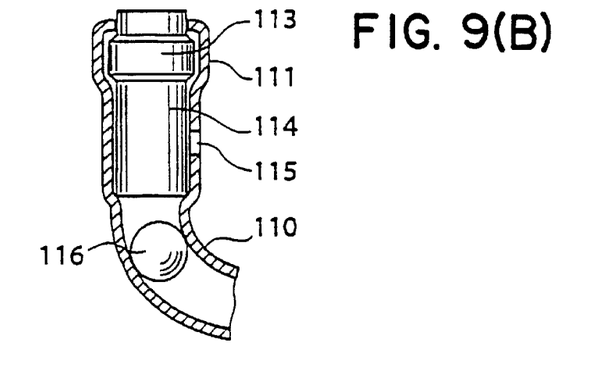
FIG. 9(B) is a frontal cross-section view of the same.
Figure 9C:
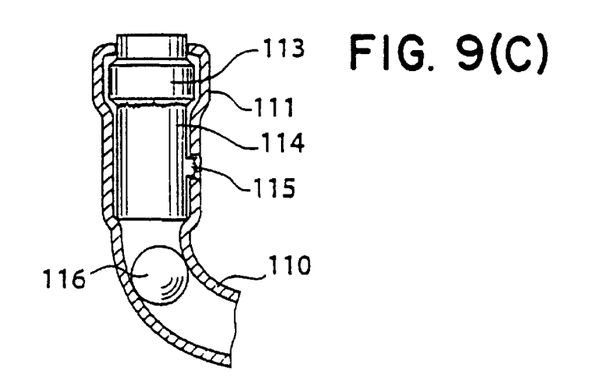
FIG. 9(C) is a frontal cross-section view of the state in the event that abnormal pressure is applied within the pipe.

In recent years, an increasing number of seatbelt devices with pretensioners have been provided to vehicles, principally automobiles. A pretensioner is for instantaneously rotating the reel (take-up shaft) on which the seatbelt is wound in the take-up direction in the event of a vehicle collision, thereby taking up the slack in the belt and providing the belt with tension. The device driving this pretensioner generally ignites gunpowder according to a detection signal emitted at the time of collision of the vehicle and drives a reel rotating mechanism by gas pressure generated by the explosion of gunpowder. A conventional example of such a pretensioner is the pretensioner disclosed in U.S. Pat. No. 5,875,634, for example. FIG. 9(A) is a perspective view illustrating the configuration of the pipe base portion of the above pretensioner, and FIG. 9(B) is a frontal cross-section view of the same part, and FIG. 9(C) is a frontal cross-section view in the event that abnormal pressure is applied within the pipe.

This pretensioner has a pipe 110. A ball 116 is stored within this pipe 110. An attachment portion 111 is formed at the end portion of the pipe 110. This attachment portion 111 is formed so as to be somewhat greater in diameter than the pipe 110. A sleeve 114 is fixed at the inner side of the attachment portion 111. A gas generator 113 is stored within the sleeve 114. Further, a hole 115 is formed to the side wall of the attachment portion 111.

The gas generator 113 explodes in response to the signal at the time of collision of the vehicle, and discharges high-pressure gas within the pipe 110. The ball 116 is accelerated by the energy of this gas. Following moving through the pipe 110, the accelerated ball 116 drives the driving belt take-up mechanism. Now, in the event that abnormal pressure exceeding normal operating pressure occurs within the pipe 110, the portion within the hole 115 bursts as shown in FIG. 9(C), and the gas generator 113 gas blows out from here. Thus, dangerously high pressure can be prevented from occurring within the pipe 110.

However, with the above conventional pretensioner, at the time of abnormal pressure exceeding normal operating pressure occurring within the pipe 110 and the inner side of the hole 115 bursting, debris from the broken portion flies. There has been the possibility that this debris could have adverse effects on other equipment in the pretensioner.

The present invention has been made in light of the above problems, and it is an object thereof to provide a pretensioner with improved safety, wherein gas is allowed to escape appropriately in the event that the internal gas pressure rises excessively, and there are no adverse effects on other equipment.

SUMMARY OF THE INVENTION

In order to solve the above problems, the pretensioner according to the present invention is a pretensioner for rotating the take-up shaft of a seatbelt in the take-up direction in the event of an emergency to provide the belt with pretension, comprising: a gas generator; a driving member accelerated by the gas generated by the gas generator; a path for storing and guiding the driving member; a channel for guiding the gas to the path; means for converting the motion of the accelerated driving member into force for rotating the take-up shaft; wherein, in the event that internal pressure exceeding a certain pressure (i.e., abnormal pressure) is applied to the channel, a gas escaping hole opens in the driving means, thereby discharging gas from the channel to the path beyond the driving member.

With such a pretensioner, even in the event that internal pressure exceeding a certain pressure (i.e., abnormal pressure) is applied to the channel, a gas releasing hole opens in the driving member due to this abnormal pressures, so the gas escapes to the driving member path beyond the driving member from this hole. Accordingly, trouble such as the channel being damaged by the abnormal pressure can be lessened.

Not only that, the gas is discharged into the path, so debris from the material does not fly in the direction of other equipment as with conventional arrangements. Accordingly, adverse effects of debris on equipment other than the pretensioner such as the seatbelt retractor can be avoided.

With the pretensioner according to the present invention, the driving member may comprise a resin member positioned on the side of the gas generator, and a metal member adjacent to the resin member; wherein a gas releasing piston formed of a material harder than the resin member is enveloped within both members; and wherein in the event that internal pressure exceeding a certain pressure (i.e., abnormal pressure) is applied to the channel, the resin member tears and gas passes between the gas releasing piston and the metal member and is discharged from the channel to the path.

Also, with the pretensioner according to the present invention, the gas releasing piston may comprise a material having a through hole. Accordingly, in the event that internal pressure exceeding a certain pressure (i.e., abnormal pressure) is applied to the channel, the resin member tears and gas passes through the through hole in the gas releasing piston and is discharged from the channel to the path.

The present invention is directed to overcoming or at least reducing some of the problems set forth above and is directed to accomplishing at least some of the objectives set forth above.

DETAILED DESCRIPTION OF THE PREFERRED EMBODIMENTS

The following is a description with reference to the drawings.

Figure 1:
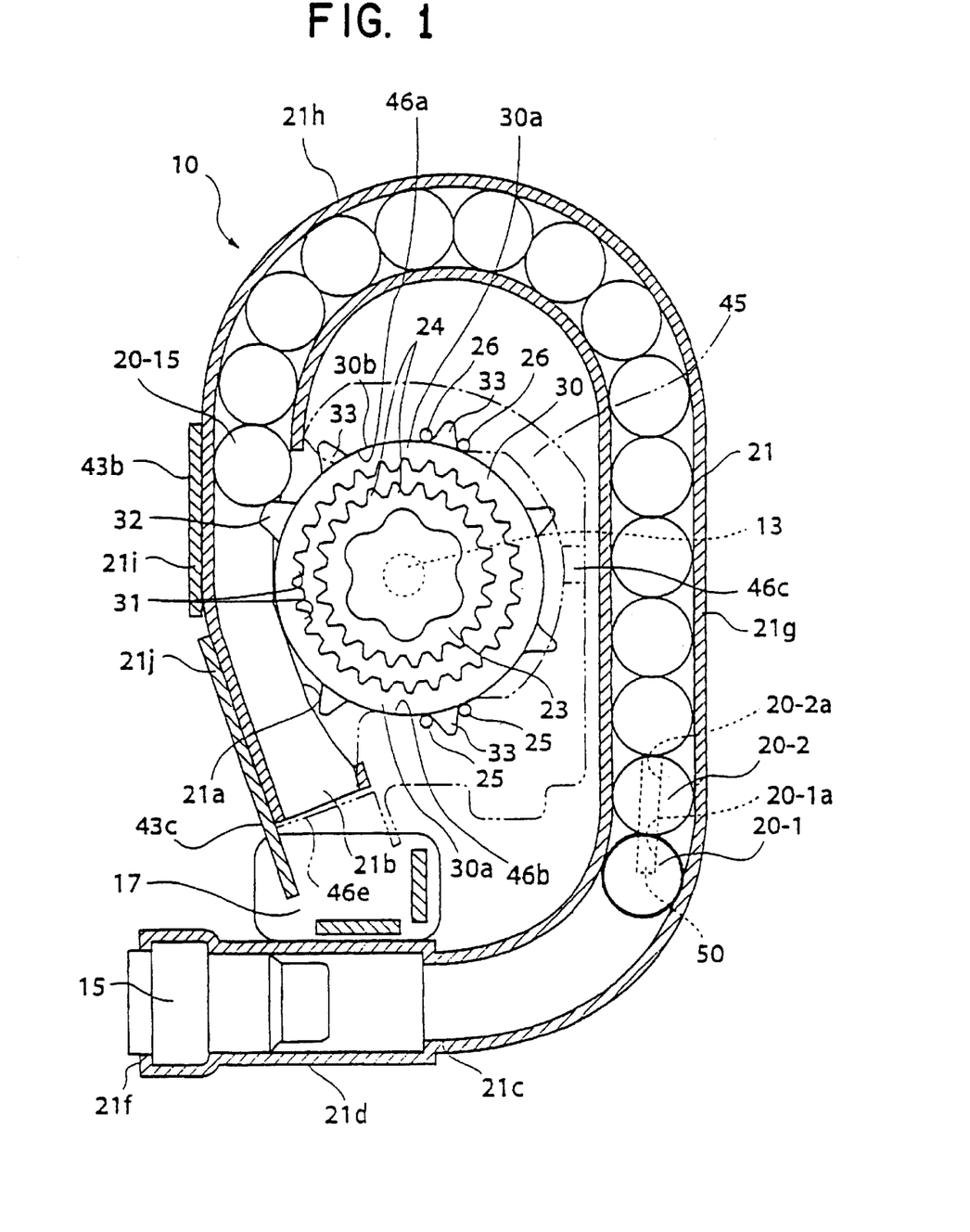
FIG. 1 is a frontal cross-section view illustrating the state before the pretensioner operates according to the first embodiment of the present invention.
Figure 2:
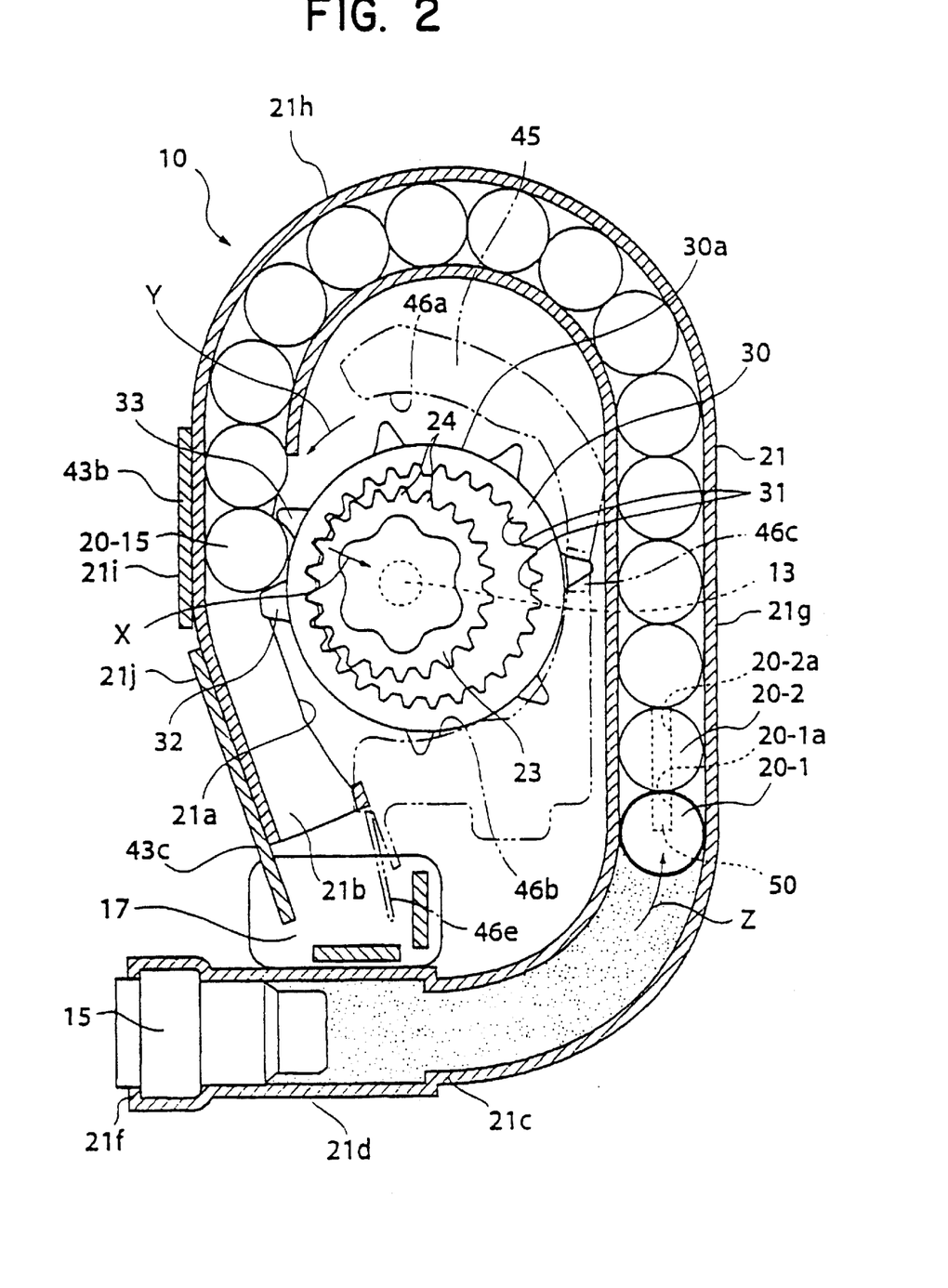
FIG. 2 is a frontal cross-section view illustrating the state of the pretensioner immediately after the gas generator ignites.
Figure 3:
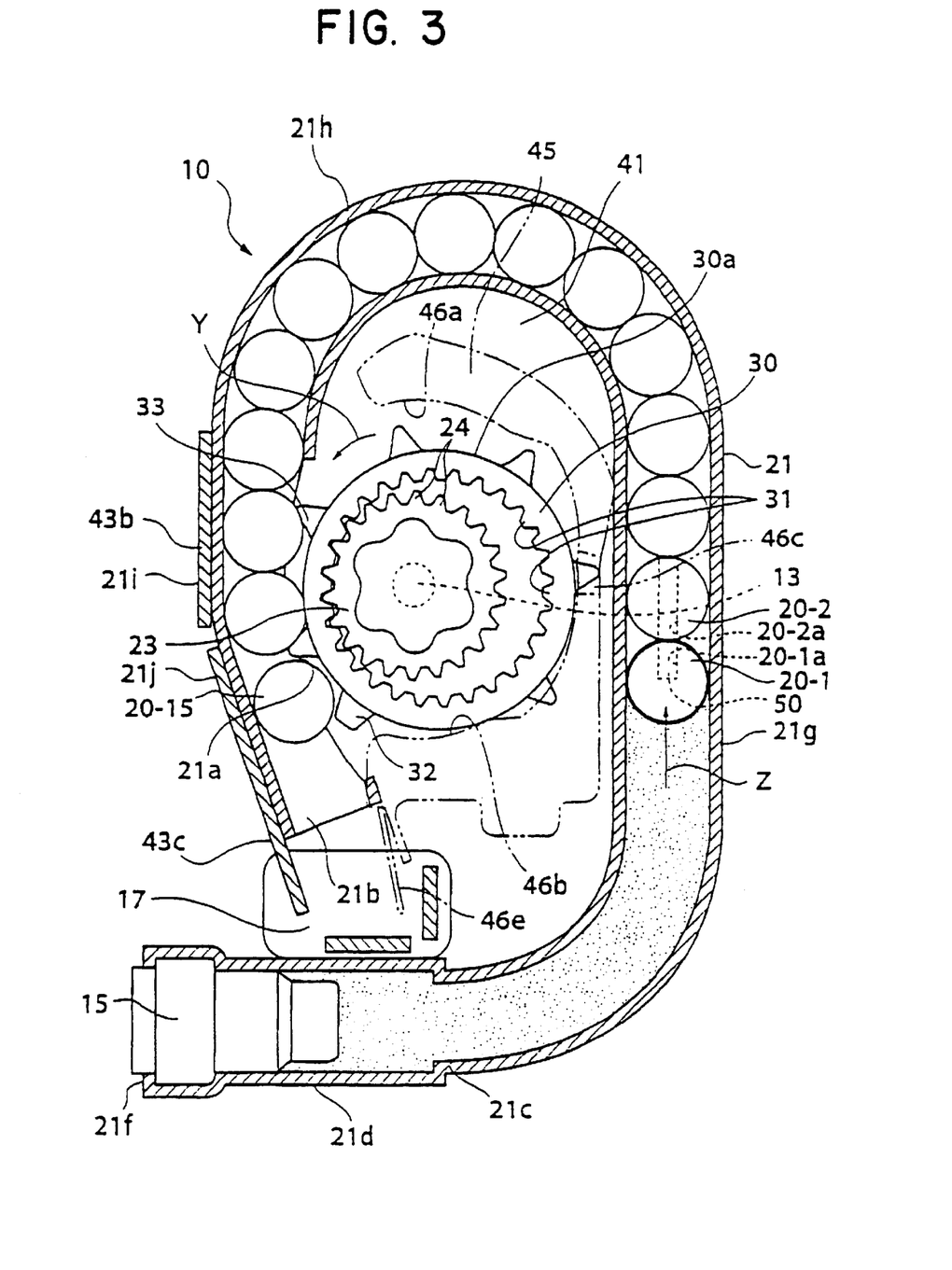
FIG. 3 is a frontal cross-section view illustrating the state of the pretensioner immediately after starting take-up of the belt.
Figure 4:
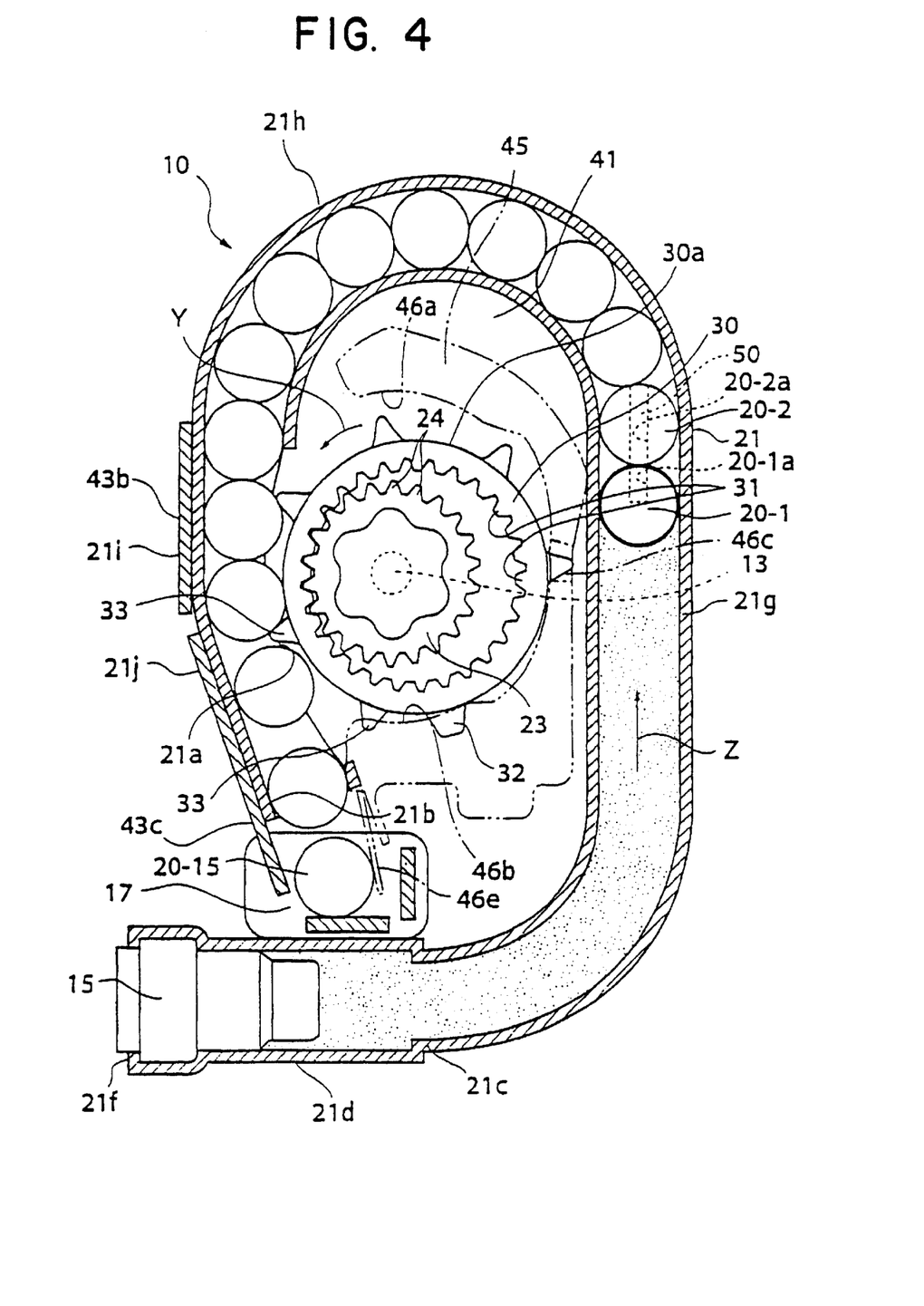
FIG. 4 is a frontal cross-section view illustrating the state of the pretensioner partway through taking up the belt.
Figure 5:
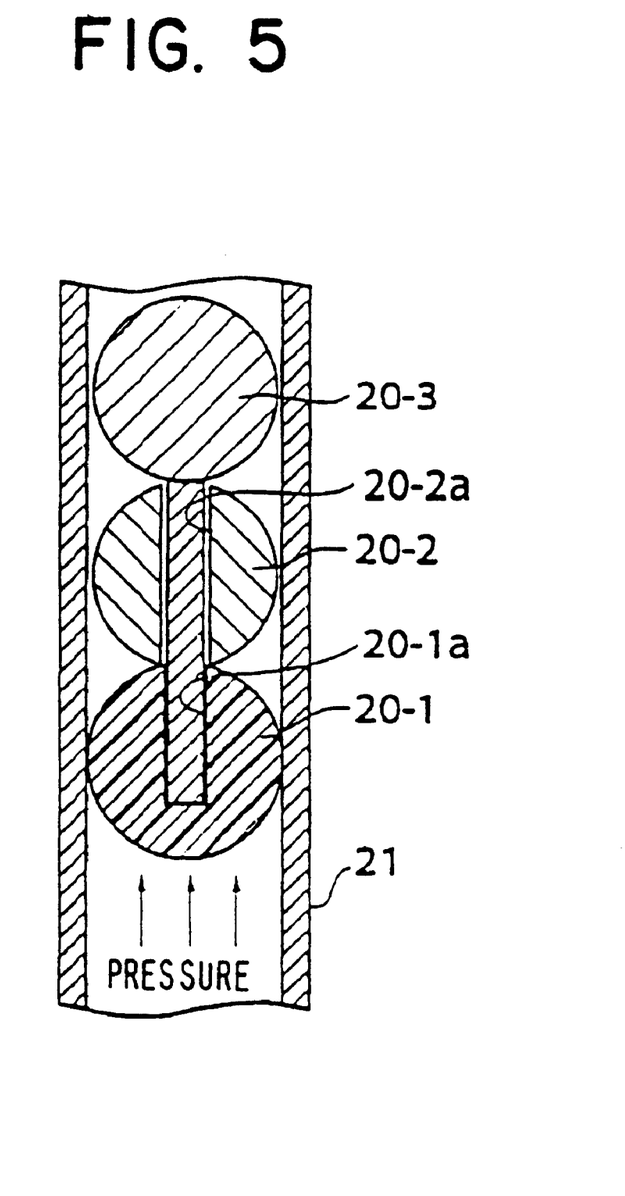
FIG. 5 is an enlarged cross-section view illustrating the state of the gas releasing portion under normal pressure.
Figure 6:
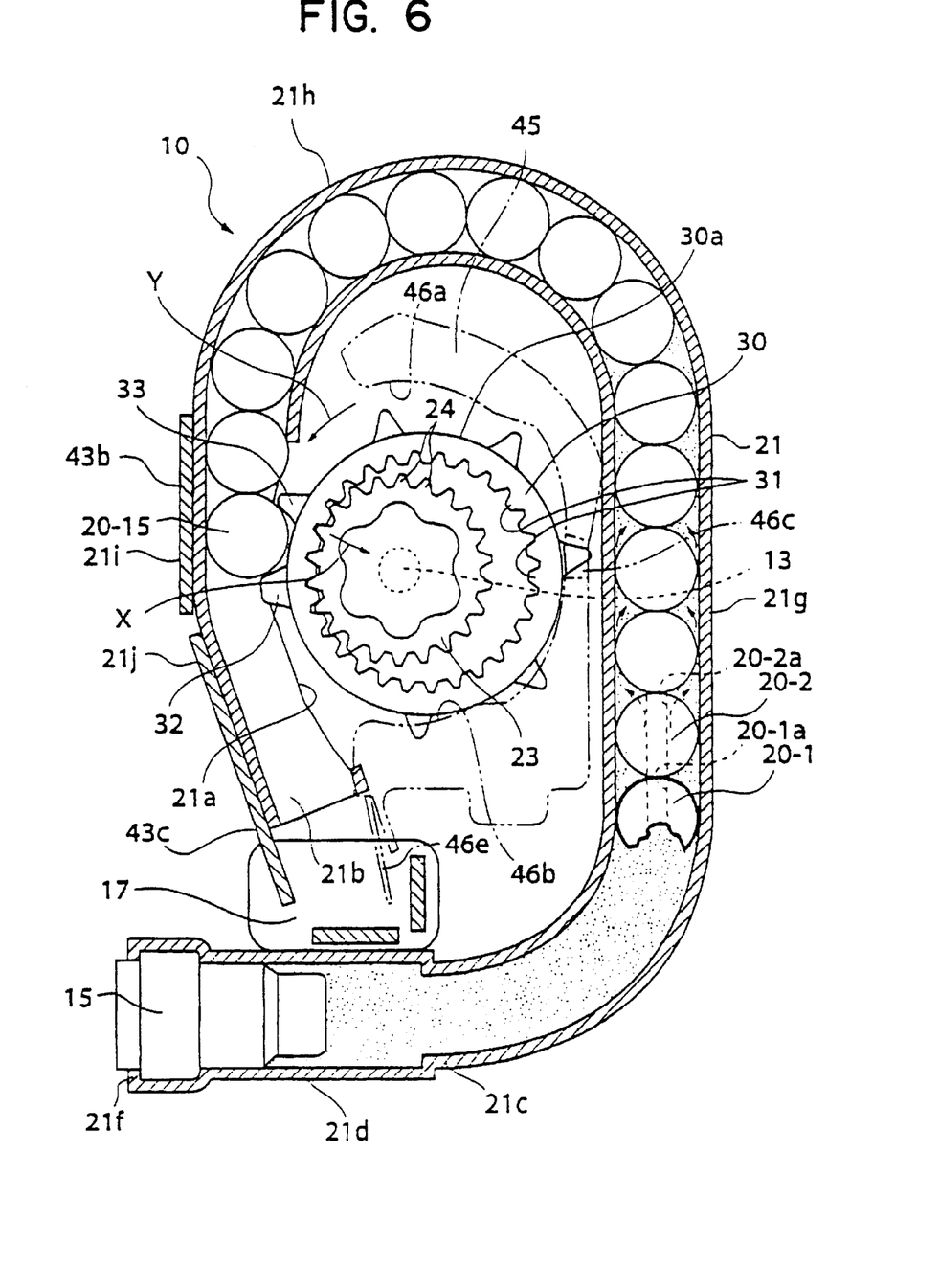
FIG. 6 is a frontal cross-section view illustrating the state of the pretensioner in the event that abnormal pressure has been generated.
Figure 7:
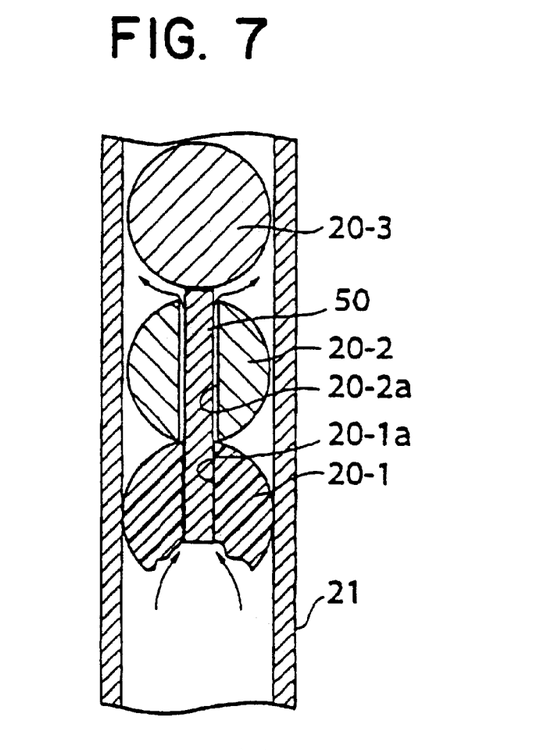
FIG. 7 is an enlarged cross-section view illustrating the state of the gas releasing portion in the event that there is abnormal pressure.

FIG. 1 through FIG. 7 are diagrams illustrating the configuration of the pretensioner according to a first embodiment of the present invention, and the operation thereof. FIG. 1 is a frontal cross-section view illustrating the state before the pretensioner operates. FIG. 2 is a frontal cross-section view illustrating the state immediately after the gas generator ignites. FIG. 3 is a frontal cross-section view illustrating the state immediately after starting take-up of the belt. FIG. 4 is a frontal cross-section view illustrating the state partway through taking up the belt. FIG. 5 is an enlarged cross-section view illustrating the state of the gas releasing portion under normal pressure. FIG. 6 is a frontal cross-section view illustrating the state of the pretensioner in the event that abnormal pressure has been generated. FIG. 7 is an enlarged cross-section view illustrating the state of the gas releasing portion in the event that there is abnormal pressure.

The pretensioner 10 shown in these Figures is assembled into the seatbelt retractor. The seatbelt retractor is provided with a reel onto which the belt is wound, a return spring for pressing the reel in the take-up direction, an emergency lock mechanism for preventing rotation of the reel in the belt extracting direction in the event that the vehicle decelerates rapidly, and so forth. These seatbelt retractor components are not shown in the Figures, but are conventionally known.

The pretensioner 10 is attached to the outer side of the frame of the seatbelt retractor. The pretensioner 10 has a pipe 21. This pipe 21 is formed by bending a steel tube (as an example). The pipe 21 bends to the upward right direction from the base 21c at the lower part of FIG. 1 at an approximately 90° angle so as to connect to the linear portion 21g, and further connect to the half-circle portion 21h at the upper portion of the FIG. 1. The tip of the half-circuit portion 21h connects to a linear portion 21i heading downwards in the diagram, with a linear portion 21j slightly inclined inwards being connected to the tip thereof. A tip hole 21b opens at the tip of this final linear portion 21j.

A notched portion 21a notched so as to allow introduction of a ring gear 30 is provided to the inner side of the linear portions 21i and 21j closer to the tip hole 21b of the pipe 21. Levers 32 and 33 of the ring gear 30 enter into the notched portion 21a.

The pipe 21 is bent, which means the overall external dimensions of the pretensioner 10 can be made small. Also, freedom in design is improved as compared to arrangements restricted to linear forms for the pipe. Incidentally, the pipe 21 may be bent in other various forms as well, such as being bent three-dimensionally, and so forth.

A pressure container 21d in the form of a pipe having somewhat a greater diameter than the pipe 21 is connected to the base portion 21c of the pipe 21. A gas generator 15 is stored within this pressure container 21d. This gas generator 15 is for igniting gunpowder based on detection signals emitted from unshown collision detecting means at the time of collision of the vehicle, and supplying gas pressure to the pipe 21. This gas generator 15 is fixed by externally caulking the flange portion 21f following being placed within the pressure container 21d.

Multiple (fifteen in FIG. 1) balls 20 are provided within this pipe 21. Of these, the balls 20-2 through 20-15 excluding the ball 20-1 closest to the gas generator 15 are metal spheres such as aluminum. The external diameter of these balls 20-2 through 20-15 is somewhat smaller than the internal diameter of the pipe 21, with a relative clearance (e.g., there is clearance of 0.4 mm for the external diameter of the balls which is 10.6 mm). The leading ball 20-15 essentially is in contact with the lever 32 of the ring gear 30.

On the other hand, the ball 20-1 closest to the gas generator 15 is formed of a resin such as silicone rubber. The ball 20-1 serves as a piston following the ignition of the gas generator 15. The ball 20-1 comes into close contact with the inner surface of the pipe 21 by deforming and spreading following ejection of gas in the event that the pressure within the pipe 21 is normal, and further serves as a seal to prevent gas from leaking to the leading side. However, the ball 20-1 is arranged so as to burst in the event that internal pressure exceeding a certain pressure (i.e., abnormal pressure) is applied to the pipe 21. This point will be described later with reference to FIG. 7.

Of these balls 20-1 through 20-15, a hole 20-1a in the longitudinal direction of the pipe is bored in the ball 20-1 as clearly illustrated in FIG. 5. This hole 20-1a is plugged off at the side of the gas generator 15 and is opened on the side of the ball 20-2. The depth of the hole 20-1a is determined according to the gas pressure to be detected as abnormal pressure. On the other hand, a through hole 20-2a perforating the ball 20-2 in the longitudinal direction of the pipe is bored in the ball 20-2.

Further, a rod-shaped gas releasing piston 50 is built into the area between the hole 20-1a of the ball 20-1 and the through hole 20-2a of the ball 20-2. This gas releasing piston 50 is formed of a material harder than the ball 20-1 (e.g., in the event that the ball 20-1 is formed of silicone, the gas releasing piston 50 is formed of aluminum). The gas releasing piston 50 has a strength of not being damaged even in the event that an internal pressure exceeding a certain pressure (i.e., abnormal pressure) is applied to the pipe 21.

Next, the mechanism for converting the motion of the balls 20 (driving members) into rotation of the take-up shaft will be described. As shown in FIG. 1 and others, a gear holder 45 having a recessed form is fit into the inner side of the pipe 21. The gear holder 45 is formed of a bendable and deformable resin material. Two pins 25 and 26 each are erected at two opposing places on this gear holder 45. The pins 25 and 26 nip the levers 33 of the later-described ring gear 30 in the state before operation of the pretensioner 10 (the state in FIG. 1).

A take-up shaft 13 fixed to the above reel passes through the gear holder 45 on the inner side of the pipe 21. The take-up shaft 13 is provided along the axial center of the reel and rotates synchronously with this reel. A pinion 23 is fixed at the periphery of the take-up shaft 13. This pinion 23 has outer teeth 24 uniformly over the entire periphery thereof.

A ring gear 30 is provided at the perimeter area of the pinion 23. This ring gear 30 has inner teeth 31 capable of meshing with the outer teeth 24 of the pinion 23 uniformly over the entire inner circumference thereof. Note that the outer teeth 24 of the pinion 23 and the inner teeth 31 of the ring gear 30 are not meshing in the state before operation of the pretensioner 10 (the state in FIG. 1). The outer teeth 24 and the inner teeth 31 have forms capable of meshing smoothly, such as disclosed in Japanese Unexamined Patent Application Publication 5-162615.

A plurality of protruding levers 32 and 33 extending outwards are provided to the perimeter surface of the ring gear 30, at predetermined intervals. Of these levers, one (reference numeral 32) has a particularly larger flat form at the apex of the protrusion as compared to the other lever 33. A trapezoid-shaped valley is formed between these adjacent levers 32 and 33. This valley is capable of engaging a later-described ball.

The two pins 25 and 26 each erected on the gear holder 45 each nip the two levers 33 opposed across the axial center of the ring gear 30. Thus, the ring gear 30 is held at a predetermined position within the gear holder 45. The inner circumference diameter of the ring gear 30 is formed so as to be greater than the outer circumference diameter of the pinion 23, so a clearance is secured between the inner teeth 31 of the ring gear 30 and the outer teeth 24 of the pinion 23 in the state shown in FIG. 1, and the two are not meshed. Accordingly, the take-up shaft 13 can freely rotate regardless of the presence of the pretensioner 10. This is the state wherein clutch mechanism formed of the pinion 23 and the ring gear 30 is disengaged.

On the other hand, a case 17 is provided to the tip of the tip hole 21b of the pipe 21. This case 17 is for storing the balls 20 discharged out from the pipe 21. A guide plate 43c exists between the end of the pipe 21 and the case 17. The case 17 serves to gather the balls 20 discharged out from the pipe 21 at one place.

Next, description will be made regarding the operation of the pretensioner 10 thus configured. At the non-operating state (normal state) of the pretensioner 10, the ring gear 30 is held at a fixed position by the pins 25 and 26 of the gear holder 45, and the ring gear 30 and pinion 23 do not mesh, as shown in FIG. 1. Subsequently, in the event that a vehicle collision state is detected, a detection signal is transmitted to the gas generator 15. As shown in FIG. 2, the gas generator 15 ignites in response to this detection signal, and gas pressure is supplied within the pipe 21. Due to this gas pressure, the ball 20-1 closest toward the gas generator 15 is pressed forwards as a piston. This pressing force sequentially presses the multiple balls 20, and the pressing force reaches the leading ball 20-15 (the ball in contact with the lever 32 of the ring gear 30).

At this time, the ball 20-1 is flattened in the direction of operation of the gas pressure (the direction of the arrow Z) by the gas pressure and the reaction of pressing the ball 20-2. Due to this flattening, the outer diameter of the ball 20-1 expands in the direction orthogonal to the operation direction of the gas pressure. Accordingly, the contact plane pressure of the ball 20-1 against the inner plane of the pipe 21 increases, so as to generate the sealing function.

The pressing force is placed on the ring gear 30 by the pressing force of the balls 20, and the pins 25 and 26 are sheared off. Accordingly, the ring gear 30 moves in the direction X in FIG. 2, and the inner teeth 31 of the ring gear 30 and the outer teeth 24 of the pinion 23 mesh. Following moving in the direction X in FIG. 2, the ring gear 30 rotates around the coaxial center by the force of the balls 20 pressing the lever 32. At the point before the ring gear 30 starts to move, the leading ball 20-15 is in contact with the lever 32 of the ring gear 30, maintaining a force thereon so as to be able to apply rotating force thereto, so the lever 32 starts rotating in a sure manner without locking.

Further, once the balls 20 are sequentially pressed out by the gas pressure, the balls 20 sequentially are engaged with the valley between the levers 33 of the ring gear 30. There is clearance between the balls 20-2 through 20-15 and the pipe 21, so the balls proceed smoothly. The ring gear 30 rotates in the direction Y shown in FIG. 2 through FIG. 4 by means of these balls 20 sequentially being engaged. The pinion outer teeth 24 and the ring gear inner teeth 31 are meshed, so the rotation of the ring gear 30 is transferred to the pinion 23, and both rotate together. At this time, the number of pinion outer teeth 24 is greater than the number of ring gear inner teeth 31, which generates a speed-increasing effect, and the pinion 23 rotates at a faster angular speed than the ring gear 30.

Further, the take-up shaft 13 and reel are fixed to the pinion 23, so the reel rotates and the belt is instantaneously taken up by a certain length in the take-up direction. Note that the rotation angle of the reel at the time of the pretensioner operating is greater than the rotating angle of the ring gear 30 due to the above speed-increasing operation, which increases the length of the seatbelt being taken in by the pretensioner 10.

The balls 20 pressed out from the tip hole 21b of the pipe 21 are collected in the case 17, as shown in FIG. 4. The case 17 collects the balls 20 ejected from the pipe 21 in one place. Accordingly, ease of the processing following the operation of the pretensioner 10 is facilitated.

Now, in the event that an internal pressure exceeding a certain pressure (i.e., abnormal pressure) is applied to the pipe 21 following operation of the pretensioner 10, the ball 20-1 is broken by this abnormal pressure, as shown in FIG. 6 and FIG. 7. Once the ball 20-1 is broken, gas pressure is placed directly on the gas releasing piston 50, but the gas releasing piston 50 itself is not broken. At this time, gas is discharged into the pipe 21 beyond the ball 20-1, between the outer surface of the gas releasing piston 50 and the inner surfaces of the hole 20-1a of the ball 20-1 and the through hole 20-2a of the ball 20-2. The outer diameter of the balls 20-2 through 20-15 is somewhat smaller than the inner diameter of the pipe 21, so gas is discharged to the tip of the pipe 21 through these gaps. Thus, the gas within the pipe 21 can be made to escape in an appropriate manner. Moreover, at this time the gas is discharged within the pipe 21, there is no debris flying out from the members, as with conventional arrangements. Accordingly, adverse effects of debris on equipment other than the pretensioner can be avoided.

The ball 20-1 can be made to break in one of the several ways, either alone or in combination. The ball 20-1 may be made of a suitable material and of a suitable density that it will crack under a predetermined pressure. The crack may be irregular, as opposed to the somewhat regularly-defined crack in FIGS. 6 and 7. However, the crack should still allow access of the gas to placed on the gas releasing piston 50. Alternatively, the ball 20-1 may be formed to crack along a somewhat regularly defined crack as set forth in FIGS. 6 and 7. Such a ball 20-1 may be formed, for example, with tear or stress lines along which the crack would proceed when sufficient pressure is applied to ball 20-1.

Figure 8:
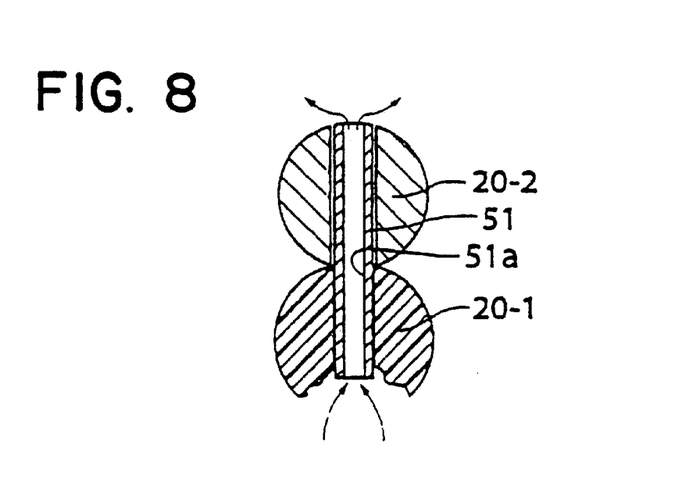
FIG. 8 is an enlarged cross-sectional view illustrating the state of the gas releasing portion of the pretensioner according to the second embodiment of the present invention, in the event of abnormal pressure.

The following is a description of the second embodiment of the present invention with reference to FIG. 8. FIG. 8 is an enlarged cross-sectional view illustrating the state of the gas releasing portion of the pretensioner according to the second embodiment of the present invention, in the event of abnormal pressure.

With the pretensioner shown in this FIG. 8, the gas releasing piston 50 according to the first embodiment is formed of a cylindrical member having a through hole 51*a*. This cylindrical gas releasing piston 51 allows gas to pass through the through hole 51*a* and be discharged into the pipe 21 beyond, in the event that an internal pressure exceeding a certain pressure (i.e., abnormal pressure) is applied to the pipe 21 following of the pretensioner 10 and the ball 20-1 breaks. The gas within the pipe 21 may be allowed to escape in this manner.

As can be clearly understood from the above description, according to the present invention, the reliability of the overall apparatus can be improved by discharging gas appropriately and reducing the gas pressure in the event that the gas pressure within the pipe rises excessively. Further, there are no adverse effects on other equipment at the time of discharging gas, and safety can be improved.

What is claimed is:

1. A pretensioner for rotating the take-up shaft of a seatbelt in the take-up direction in the event of an emergency to provide the belt with pretension, the pretensioner comprising:

a gas generator;

a driving member moved by the gas generated by the gas generator;

a path for storing and guiding the driving member;

a channel for guiding the gas to the path;

means for converting the motion of the driving member into force for rotating the take-up shaft;

a gas escaping hole in the driving member that becomes open when internal pressure of the gas exceeding a certain pressure is applied to the driving member, thereby discharging gas to the path beyond the driving member.

2. The pretensioner of claim 1, wherein the driving member comprises a resin member positioned on the side of the gas generator and a metal member adjacent to the resin member;

wherein a gas releasing piston formed of a material harder than the resin member is loosely connected between both members;

and wherein the internal pressure of the gas exceeds a certain pressure, the resin member breaks and gas passes alongside the gas releasing piston and the metal member and is discharged to the path.

3. The pretensioner of claim 2, wherein the gas releasing piston comprises a material having a through hole:

and wherein in the event that internal pressure of the gas exceeds a certain pressure the gas passes through the through hole in the gas releasing piston and is discharged to the path.

4. A pretensioner for rotating the take up-shaft of a seat belt in the take-up direction in the event of an emergency to provide the belt with pretension, said pretensioner comprising:

a gas generator;

a driving member driven by the gas generated by the gas generator;

a path for storing and guiding the driving member;

a channel for guiding said gas to said path;

a mechanical connection for converting the motion of the driving member into force for rotating the take-up shaft;

a gas escaping hole in the driving member that becomes open when the internal pressure of the gas in the channel exceeds a certain pressure, thereby discharging gas to the path beyond the driving member.

5. The pretensioner of claim 4, wherein the driving member comprises a resin ball positioned on the side of the gas generator and having hole bored partially through in the longitudinal direction but which is closed off at the side of the gas generator and opened on the opposite side, a metal ball adjacent to the resin ball and having a through hole therein in the longitudinal direction, and a piston placed in the holes of the resin ball and the metal ball.

6. The piston of claim 5, wherein the piston is solid and is loosely placed in the holes of the resin ball and the metal ball.

7. The piston of claim 5, wherein the piston is at least partially hollowed out along its length to allow the passage of gas therethrough.

* * * * *